United States Patent
Chan (10) Patent No.: US 8,797,150 B2
(45) Date of Patent: Aug. 5, 2014

(54) METHOD AND SYSTEM FOR POWER LINE NETWORKING FOR INDUSTRIAL PROCESS CONTROL APPLICATIONS

(75) Inventor: Tat Keung Chan, South San Francisco, CA (US)

(73) Assignee: Asoka USA Corporation, Santa Clara, CA (US)

( * ) Notice: Subject to any disclaimer, the term of this patent is extended or adjusted under 35 U.S.C. 154(b) by 1931 days.

(21) Appl. No.: 11/845,020

(22) Filed: Aug. 24, 2007

(65) Prior Publication Data

US 2008/0088419 A1 Apr. 17, 2008

Related U.S. Application Data

(60) Provisional application No. 60/824,227, filed on Aug. 31, 2006.

(51) Int. Cl.
| | | |
|---|---|---|
| G08C 19/16 | (2006.01) | |
| G05B 11/01 | (2006.01) | |
| H04L 12/28 | (2006.01) | |
| H01B 11/02 | (2006.01) | |
| H01P 5/12 | (2006.01) | |
| H04B 3/54 | (2006.01) | |

(52) U.S. Cl.
CPC ........ *H04B 3/542* (2013.01); *H04B 2203/5487* (2013.01); *H04B 2203/5466* (2013.01); *H04B 2203/5475* (2013.01)
USPC .................. 340/12.32; 340/12.34; 340/12.39; 340/12.4; 340/12.52; 370/401; 370/402; 174/34; 333/100

(58) Field of Classification Search
USPC ............................. 709/200; 340/870.02, 12.32
See application file for complete search history.

(56) References Cited

U.S. PATENT DOCUMENTS

| | | | | |
|---|---|---|---|---|
| 4,404,424 | A  * | 9/1983 | King et al. ....................... | 174/34 |
| 5,353,499 | A  * | 10/1994 | Hattori et al. .................. | 29/852 |
| 7,016,368 | B2 | 3/2006 | Binder | |
| 7,035,280 | B2 | 4/2006 | Binder | |
| 7,095,756 | B2 | 8/2006 | Binder | |
| 7,251,236 | B1 * | 7/2007 | Cook ............................. | 370/338 |
| 7,333,000 | B2 * | 2/2008 | Vassallo ........................ | 340/5.92 |
| 2004/0160309 | A1 * | 8/2004 | Stilp ............................. | 340/10.2 |
| 2004/0212481 | A1 * | 10/2004 | Abraham .................. | 340/310.01 |

(Continued)

OTHER PUBLICATIONS

J Aggarwal et al. Computer Network Designn for a Chip Manufacturing Plant. Published Nov. 1992.*

Rabiee, M. Local Area Network (LAN) in Mahufacturing. Journal of Industrial Technology vol. J 15, No. 2, 1999.*

(Continued)

*Primary Examiner* — Jennifer Mehmood
*Assistant Examiner* — Pameshanand Mahase
(74) *Attorney, Agent, or Firm* — Baker Botts L.L.P.

(57) ABSTRACT

A real-time management networking system for a manufacturing environment, e.g., chemical, assembly, automobile, electronic, petroleum. In a specific embodiment, the system has a spatial region, which is adapted for one or more manufacturing equipment devices. The one or more manufacturing equipment devices is associated with a manufacture of a product. In a specific embodiment, the manufacturing equipment is able to generate a high frequency noise, which causes interference with a conventional data signal, which is often unshielded. In a specific embodiment, the system has a power line gateway device provided within a desired region of the spatial region.

21 Claims, 8 Drawing Sheets

(56) References Cited

U.S. PATENT DOCUMENTS

| | | | |
|---|---|---|---|
| 2005/0111533 A1* | 5/2005 | Berkman et al. | 375/220 |
| 2005/0164666 A1* | 7/2005 | Lang et al. | 455/282 |
| 2005/0200459 A1* | 9/2005 | White | 340/310.01 |
| 2005/0246408 A1* | 11/2005 | Chung | 709/200 |
| 2005/0273282 A1* | 12/2005 | Mollenkopf | 702/62 |
| 2005/0285720 A1* | 12/2005 | Cope et al. | 340/310.13 |
| 2006/0133736 A1* | 6/2006 | Sullivan | 385/59 |

OTHER PUBLICATIONS

Asoka PlugLink USB and Ethernet Wall Mounts User's Manual, Copyright 2003.*

Aggarwal et al, Computer Network Design for a Chip Manufacturing Plant, IEEE Region 10 Conference, Nov. 1992, entire document.

Rabiee, Local Area Network (LAN) in Manufacturing, Journal of Industrial Technology vol. 15, No. 2, Feb. 1999 to Apr. 1999, entire document.

* cited by examiner

METHOD AND SYSTEM FOR POWER LINE NETWORKING FOR INDUSTRIAL PROCESS CONTROL APPLICATIONS

CROSS-REFERENCES TO RELATED APPLICATIONS

This application claims priority to U.S. Provisional Application No. 60/824,227, filed Aug. 31, 2006, which is related to U.S. patent application Ser. No. 11/245,700, filed Oct. 7, 2005. Both applications are commonly assigned, and hereby incorporated by reference for all purposes.

BACKGROUND OF THE INVENTION

The present invention relates generally to power line networking techniques for industrial applications. More particularly, the invention provides a method and system for a high speed power line network in an industrial environment such as manufacturing of electronic devices, mechanical devices, chemical/petrochemical, and petroleum products. Merely by way of example, the invention has been applied in a local area network environment, but it would be recognized that other applications exist.

Telecommunication techniques have been around for numerous years. In the early days, a communication technique known as telegraph was developed. Telegraph generally transferred information from one geographical location to another geographical location using electrical signals in the form of "dots" and "dashes" over transmission lines. An example of commonly used electrical signals is Morse code. Telegraph has been, for the most part, replaced by telephone. The telephone was invented by Alexander Graham Bell in the 1800s to transmit and send voice information using electrical analog signals over a telephone line, or more commonly a single twisted pair copper line. Most industrialized countries today rely heavily upon telephone to facilitate communication between businesses and people, in general.

In the 1990s, another significant development in the telecommunication industry occurred. People began communicating to each other by way of computers, which are coupled to the telephone lines or telephone network or other communication network. These computers or workstations coupled to each other can transmit many types of information from one geographical location to another geographical location. In general, there has been various types of computer networks, including local area networks, commonly called LANs, and wide are networks, commonly called WANs.

Computer networks have been useful on monitoring and controlling equipment used for the manufacture of products. These products range in variety from automobiles, electronic devices, textiles, and other materials. These materials can include chemicals, petrochemicals, and petroleum products. Although somewhat successful, many limitations still exist with the use of computer networks in a manufacturing environment.

As merely an example, manufacturing environments are often "noisy" and full of things that lead to interference of telecommunication signals That is, high frequency noise often interferes with conventional computer networks and/or control systems. The high frequency noise is often derived from a wide variety of manufacturing equipment, such as high voltage generators, mechanical stamping devices, and the like. Additionally, manufacturing environments are also "dirty" and have particulate contamination, grime, and other substances that lead to failure of high precision electronic devices. High precision electronic devices often have reliability failures in such environments. These and other limitations are described throughout the present specification and more particularly below.

From the above, it is seen that improved techniques for power line networks are highly desired.

BRIEF SUMMARY OF THE INVENTION

According to the present invention, techniques for power line networking techniques for industrial applications are provided. More particularly, the invention provides a method and system for a high speed power line network in an industrial environment such as manufacturing of electronic devices, mechanical devices, chemical/petrochemical, and petroleum products. Merely by way of example, the invention has been applied in a local area network environment, but it would be recognized that other applications exist.

In a specific embodiment, the present invention includes a real-time management networking system for a manufacturing environment, e.g., chemical, assembly, automobile, electronic, petroleum. In a specific embodiment, the system has a spatial region, which is adapted for one or more manufacturing equipment devices. The one or more manufacturing equipment devices is associated with a manufacture of a product. In a specific embodiment, the manufacturing equipment is able to generate a high frequency noise, which causes interference with a conventional data signal, which is often unshielded. In a specific embodiment, the system has a power line gateway device provided within a desired region of the spatial region. The power line gateway device has a power line device coupled to an interface device and a coupling device. In a specific embodiment, the interface device is coupled to a data connection. The power line device is capable of converting a data signal from the data connection into a power line signal. In a preferred embodiment, the system also has one or more shielded cables coupled to the coupling device and an outlet device coupled to at least the one or more shielded cables. In a preferred embodiment, the outlet device is adapted to convert the power line signal into at least an Ethernet signal or a RS232 signal. In preferred embodiments, the Ethernet signal or RS232 signal is substantially free from interference from the high frequency noise.

Numerous benefits are achieved using the present invention over conventional techniques. The present invention can be applied using conventional components from computer networking and hardware technologies. Additionally, the invention can be applied to pre-existing power line structures without substantial modification. Preferably, the present system and method are easy to implement and also selectively connect and depending upon the user. In preferred embodiments, the invention also provides for security between users. Depending upon the embodiment, one or more of these benefits may exist. These and other benefits have been described throughout the present specification and more particularly below.

Various additional objects, features and advantages of the present invention can be more fully appreciated with reference to the detailed description and accompanying drawings that follow.

DETAILED DESCRIPTION OF THE INVENTION

According to the present invention, techniques for power line networking techniques for industrial applications are provided. More particularly, the invention provides a method and system for a high speed power line network in an industrial environment such as manufacturing of electronic devices, mechanical devices, chemical/petrochemical, and petroleum products. Merely by way of example, the invention has been applied in a local area network environment, but it would be recognized that other applications exist.

Figure 1:
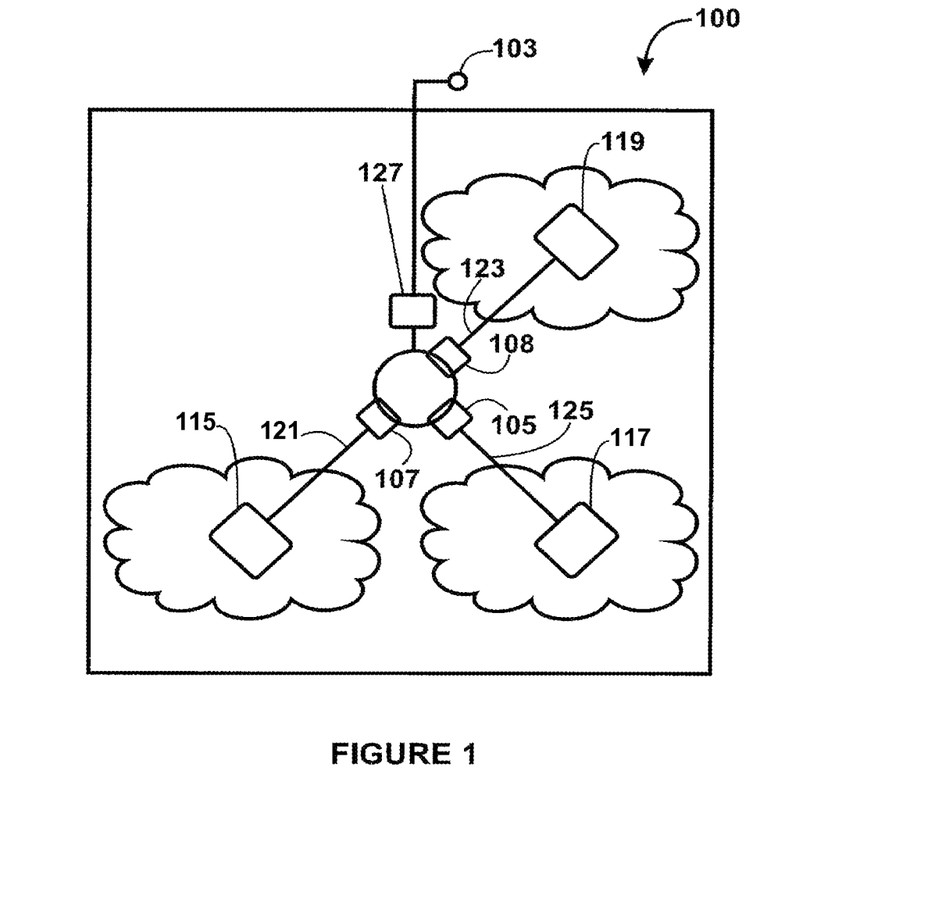
FIG. 1 is a simplified diagram of a real-time management networking system according to an embodiment of the present invention.

FIG. 1 is a simplified diagram of a real-time management networking system 100 according to an embodiment of the present invention. This diagram is merely an example, which should not unduly limit the scope of the claims herein. One of ordinary skill in the art would recognize many variations, alternatives, and modifications. As shown, the diagram illustrates a real-time management networking system for a manufacturing environment. In a specific embodiment, the manufacturing environment can be a chemical plant, an electrical assembly plant, a petroleum plant, a petrochemical plant, any combination of these, and the like. As used herein, the term "real-time" should be interpreted by its ordinary meaning and generally means active control in a live setting according to a specific embodiment. That is, the control characteristic delay time is an amount that allows for control and management of a system without significant delay according to a specific embodiment. Of course, there can be other variations, modifications, and alternatives.

Referring again to FIG. 1, the diagram illustrates a spatial region within an industrial facility and/or outside of a vicinity of the facility. The spatial region can be an entire portion of the plant or a smaller portion of the plant according to a specific embodiment. The spatial region can be in a "plane" or the three dimensional spatial region adapted for one or more manufacturing equipment devices, which are associated with a manufacture of a product. In a specific embodiment, the manufacturing equipment is able to generate a high frequency noise, which causes interference with a data signal in a conventional network setting that is plagued with noise.

As shown, the system 100 for power line networking is included. The system 100 has an external data source 103, which is derived from a world wide networks of computers. As merely an example, the data source can be the Internet or other like entity. Alternatively, the data source can also be coupled to a controller, which oversees information from a manufacturing and/or assembly process. The system includes a first power line 121, a second power line 123, and a third power line 125. In a specific embodiment, there can also be "N" power lines, where N is an integer greater than three. Of course, there can be other variations, modifications, and alternatives.

In a specific embodiment, a power line gateway device is provided within a desired region of the spatial region. In a specific embodiment, the power line gateway device has a power line device coupled to an interface device and a coupling device. The interface device is coupled to a data connection. In a specific embodiment, the power line device is capable of converting a data signal from the data connection into a power line signal. Details of the gateway device is provided throughout the present specification and more particularly below.

Referring again to FIG. 1, the system includes gateway device 127 coupled between the data source and an AC power lines according to a specific embodiment. The AC power line couples to a plurality of power line devices 108, 105, 107, numbered from 1 through N, where N is an integer greater than 2, according to a specific embodiment. Each of the power line devices is coupled to a client device or a plurality of client devices to define a "segment" on the power line network. As shown, power line device 107 couples to client device 115. Power line device 105 couples to client device 117. Power line device 108 couples to client device 119. Depending upon the specific embodiment, the client device can be a personal computer, a wireless device, a lap top computer, an Internet phone, an Internet appliance (e.g., refrigerator, stereo, television set, clock, digital paintings), any combinations of these, and others.

In a preferred embodiment, the present network system has one or more shielded cables coupled to the coupling device. In a specific embodiment, the one or more shielded cables comprises a first end and a second end. In a specific embodiment, the first end is coupled to the coupling device. The one more shielded cables comprises a conventional cable having a first insulating material provided on the conventional cable, a shielding provided overlying the first insulating material, and a second insulating material overlying the shielding. The one or more shielded cables is adapted to transfer the power line signal free from any substantial interference with the high frequency noise being able to cause interference with the power line signal. Further details of the shielded cables are provided throughout the present specification and more particularly below.

In preferred embodiments, the client device includes an equipment for the manufacture of one or more products. As shown, the power line network is configured as a hub and spoke arrangement. The hub includes power line devices and coupling devices. Each of the devices is coupled to a client device or client devices to form a segment in the power line network. As shown, the gateway device includes an outlet device coupled to at least the second end of the one or more shielded cables, the outlet device being adapted to convert the power line signal into at least an Ethernet signal or a RS232 signal, the Ethernet signal or RS232 signal being substantially free from interference from the high frequency noise. Of course, one of ordinary skill in the art would recognize. Further details of the gateway and power line device can be found throughout the present specification and more particularly below.

Figure 2:
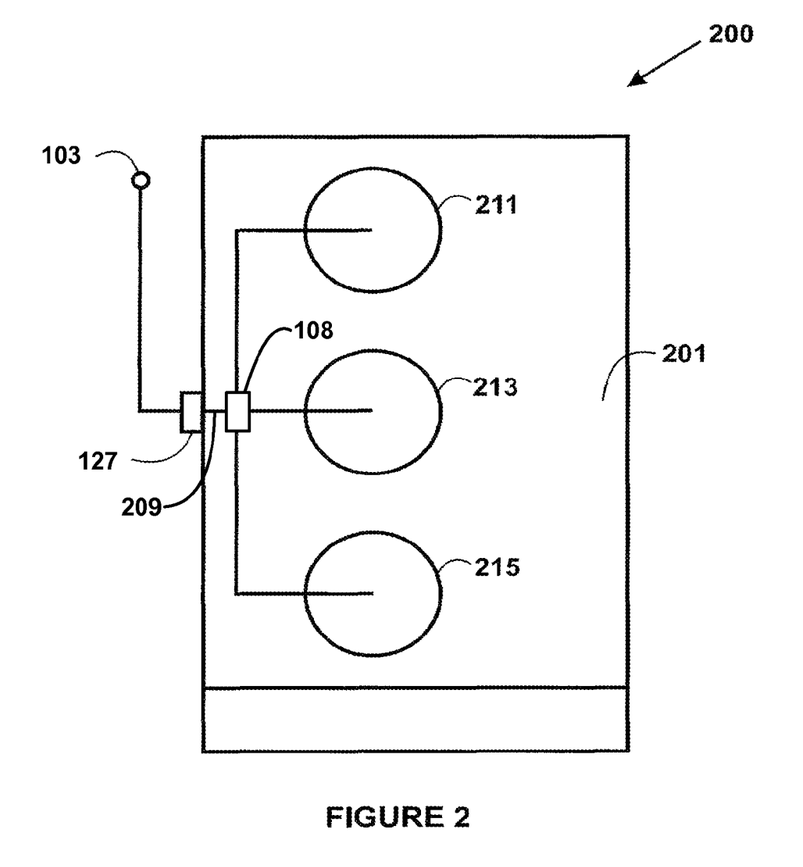
FIG. 2 is a simplified diagram of a real-time management networking system according to an alternative embodiment of the present invention.

FIG. 2 is a simplified diagram of a real-time management networking system 200 according to an alternative embodiment of the present invention. This diagram is merely an example, which should not unduly limit the scope of the claims herein. One of ordinary skill in the art would recognize many variations, alternatives, and modifications. As shown, the diagram illustrates a real-time management networking system for a manufacturing environment. In a specific embodiment, the manufacturing environment can be a chemical plant, an electrical assembly plant, a petroleum plant, a petrochemical plant, any combination of these, and the like. As used herein, the term "real-time" should be interpreted by its ordinary meaning and generally means active control in a live setting according to a specific embodiment. That is, the control characteristic delay time is an amount that is free from significant delay according to a specific embodiment. Of course, there can be other variations, modifications, and alternatives.

Referring again to FIG. 2, the diagram illustrates a spatial region 201 within an industrial facility and/or outside of a vicinity of the facility. The spatial region can be an entire portion of the plant or a smaller portion of the plant according to a specific embodiment. The spatial region can be in a "plane" or the three dimensional spatial region adapted for one or more manufacturing equipment devices, which are associated with a manufacture of a product. In a specific embodiment, the manufacturing equipment is able to generate a high frequency noise, which causes interference with a data signal in a conventional network setting that is plagued with noise.

As shown, the diagram includes a power line gateway device 127 being provided within a desired region of the spatial region. In a specific embodiment, the power line gateway device has a power line device coupled to an interface device and a coupling device. The interface device is coupled to a external data source 103. In a specific embodiment, the power line device is capable of converting a data signal from the external data source into a power line signal. Of course, there can be other variations, modifications, and alternatives.

In a specific embodiment, the system includes the gateway device 127 coupled between the data source and an AC power lines according to a specific embodiment. The AC power line 209 couples to a plurality of power line devices numbered from 1 through N, where N is an integer greater than 2, according to a specific embodiment. Each of the power line devices is coupled to a client device or a plurality of client devices to define a "segment" on the power line network. As shown, power line device 108 couples to client device 211. Power line device 108 couples to client device 213. Power line device 108 couples to client device 215 (including other devices N, where N is an integer greater than 4). Depending upon the specific embodiment, the client device can be a personal computer, a wireless device, a lap top computer, an Internet phone, an Internet appliance (e.g., refrigerator, stereo, television set, clock, digital paintings), any combinations of these, and others. Of course, there can be other variations, modifications, and alternatives.

In a preferred embodiment, the present network system has one or more shielded cables coupled to the coupling device. In a specific embodiment, the one or more shielded cables comprises a first end and a second end. In a specific embodiment, the first end is coupled to the coupling device. The one more shielded cables comprises a conventional cable having a first insulating material provided on the conventional cable, a shielding provided overlying the first insulating material, and a second insulating material overlying the shielding. The one or more shielded cables is adapted to transfer the power line signal free from any substantial interference with the high frequency noise being able to cause interference with the power line signal. Further details of the shielded cables are provided throughout the present specification and more particularly below.

In preferred embodiments, the client device includes an equipment for the manufacture of one or more products. As shown, the power line network is configured in a parallel arrangement. The gateway includes a plurality of power line devices and coupling devices. Each of the power line devices is coupled to a client device or client devices to form a segment in the power line network. Of course, one of ordinary skill in the art would recognize. As shown, the client device includes an outlet device coupled to at least the second end of the one or more shielded cables, the outlet device being adapted to convert the power line signal into at least an Ethernet signal or a RS232 signal, the Ethernet signal or RS232 signal being substantially free from interference from the high frequency noise. Of course, one of ordinary skill in the art would recognize. Further details of the gateway and power line device can be found throughout the present specification and more particularly below.

Figure 3:
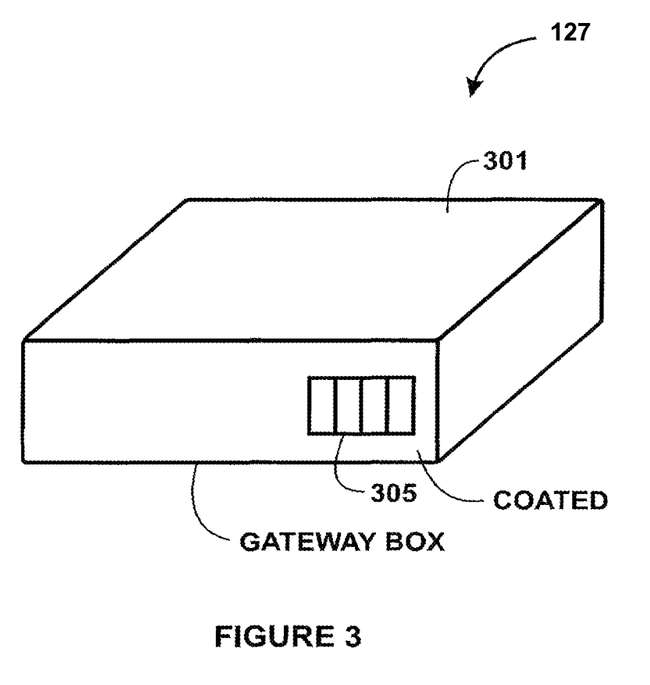
FIG. 3 is a simplified diagram of an industrialized gate way device according to an embodiment of the present invention.

FIG. 3 is a simplified diagram of an industrialized gateway device 127 according to an embodiment of the present invention. This diagram is merely an example, which should not unduly limit the scope of the claims herein. One of ordinary skill in the art would recognize many variations, alternatives, and modifications. As shown, the gateway device has a housing 301 including at least three input/output ports 305, which can be coupled to external power lines according to a specific embodiment. In a specific embodiment, one or more power line signals is derived from the housing.

In a preferred embodiment, the power line signal coupled to each of the three input/output ports. That is, the power line signal is injected directly into each of the phases. In a specific embodiment, the present power line signal is injected directly into each of the phases, where the phases are not coupled to each other upon injection according to a specific embodiment. The three input/output ports include a first phase input/output port coupled to the first power line, a second phase input/output port coupled to the second power line, and a third input/output port coupled to the third power line. Of course, there can be other variations, modifications, and alternatives. Further details of the gateway system can be found throughout the present specification and more particularly below.

Figure 4:
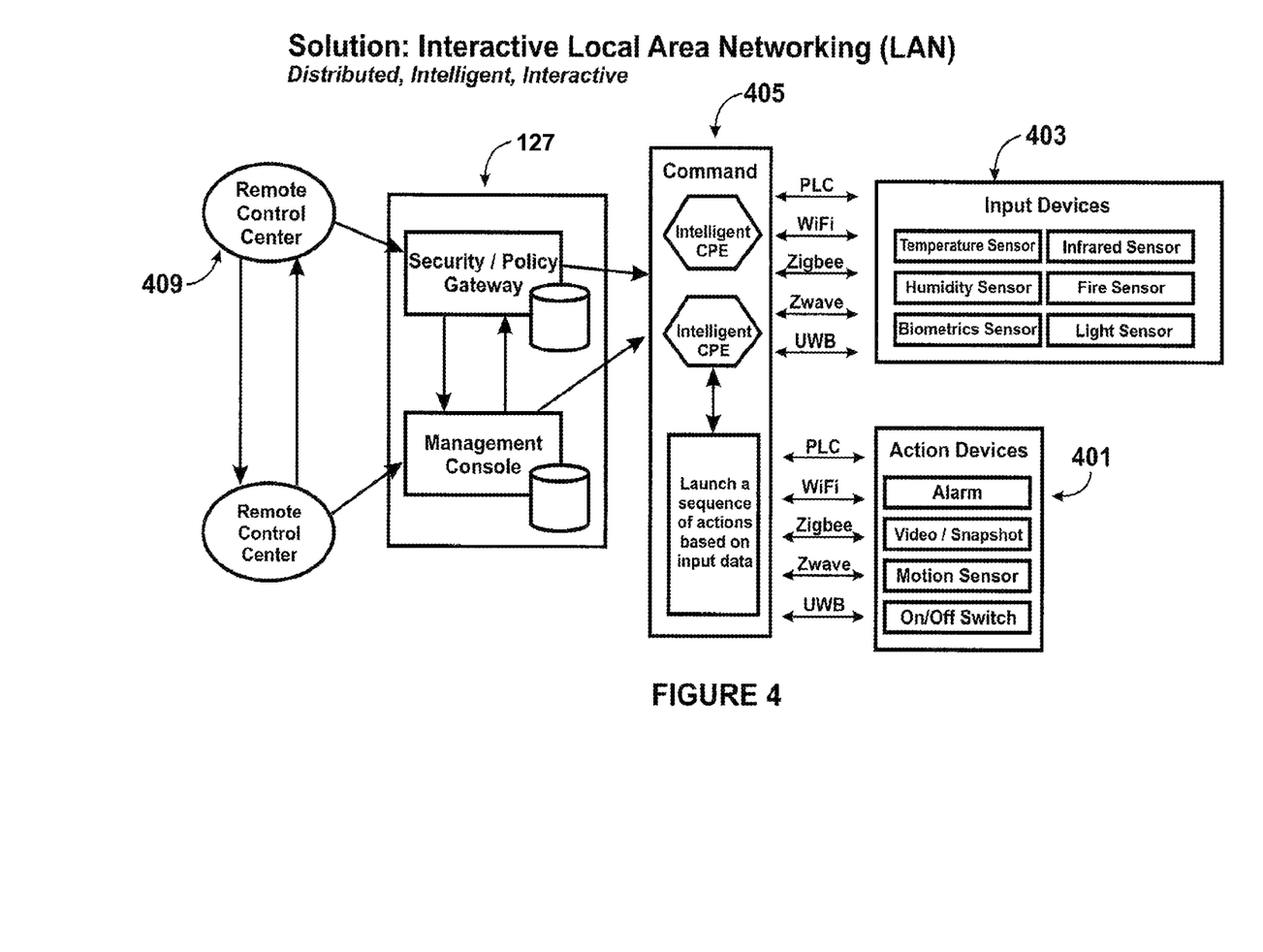
FIG. 4 is a simplified block diagram of an industrialized gateway device in a network according to an embodiment of the present invention.

FIG. 4 is a simplified block diagram of an industrialized gateway device in a network according to an embodiment of the present invention. This diagram is merely an example, which should not unduly limit the scope of the claims herein. One of ordinary skill in the art would recognize many variations, alternatives, and modifications. As shown, the gateway system, which includes the gateway device 127 includes a plurality of action devices 401. The action devices can include an alarm, a video/snapshot, a motion sensor, and an on/off switch, among other devices. Depending upon the embodiment, communication between the action devices and command can occur using anyone or a combination of power line communication (PLC), wireless communication (WiFi), Zigbee, ZWave, UWV, and others. Of course, there can be other variations, modifications, and alternatives.

Referring again to FIG. 4, the system includes a plurality of input devices 403, which are provided from one or more equipment used for manufacture of products. In a specific embodiment, the inputs can include a temperature sensor, humidity sensor, biometrics sensor, infrared sensor, fire sensor, light sensor, chemical sensor, and others. Of course, there can be other variations, modifications, and alternatives. Depending upon the embodiment, communication between the action devices and command can occur using any one or a combination of power line communication (PLC), wireless communication (WiFi), Zigbee™, ZWave™ (e.g., Z-Wave™ is a wireless RF-based communications technology designed for residential and light commercial control and status reading applications such as meter reading, lighting and appliance control, HVAC, access control, intruder and fire detection, etc. Z-Wave transforms any stand-alone device into an intelligent networked device that can be controlled and monitored wirelessly.), UWV, and others. Of course, there can be other variations, modifications, and alternatives.

Referring again to FIG. 4, the system has a command center 405, including intelligent devices 405. Such devices launch one or more actions based upon the input data provided from the various input devices and/or action devices. Coupled to the command center is the security/policy gateway device and a management console according to a specific embodiment. The gateway is coupled to a wide area network (WAN) or a world wide WAN. Remote devices 409 couple into the gateway via the network according to a specific embodiment. The one or more remote devices can be used to monitor and/or control equipment coupled to the input devices. The input devices can be provided on one or more pieces of equipment used for the manufacture of products. Of course, there can be other benefits, modifications, and alternatives. Further details of a gateway device can be found throughout the present specification and more particularly below.

Figure 5:
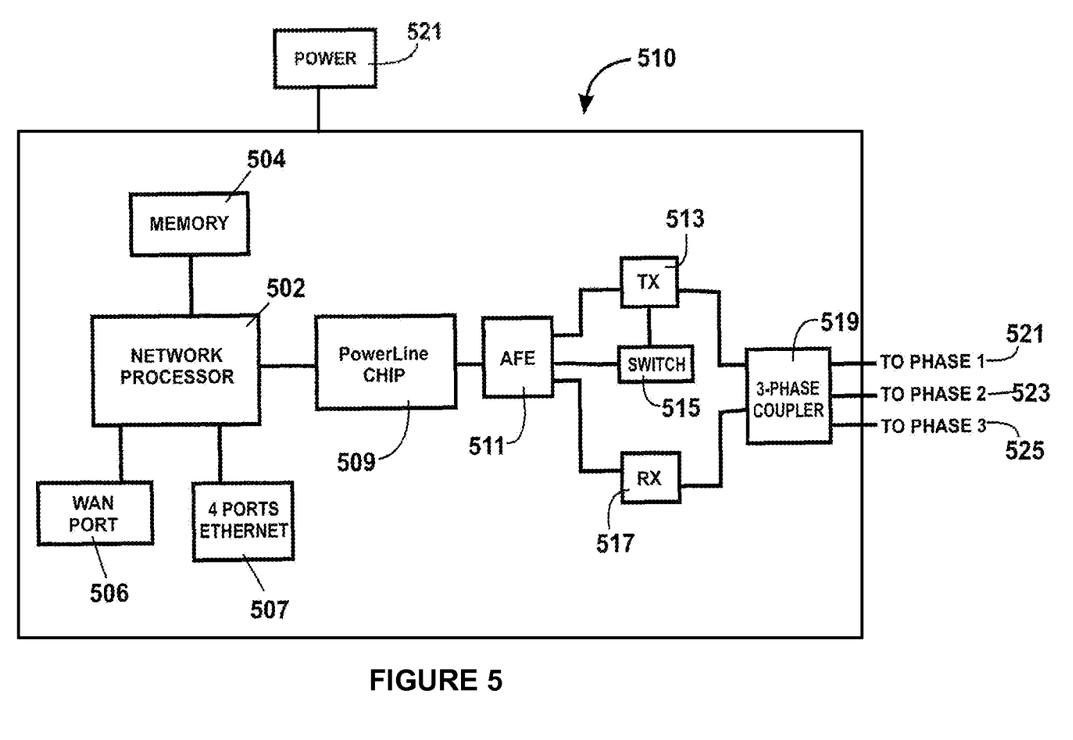
FIG. 5 is a simplified block diagram of a gate way device according to an embodiment of the present invention.

FIG. 5 is a simplified block diagram 510 of a gate way device according to an embodiment of the present invention. This diagram is merely an example, which should not unduly limit the scope of the claims herein. One of ordinary skill in the art would recognize many variations, alternatives, and modifications. As shown, the system has a network processor 502 within the housing and coupled to the power line signal via power line chip 509. In a specific embodiment, the network processor includes a network connector input/output port 506 coupled the network processor and coupled to the housing. Of course, there can be other variations, modifications, and alternatives.

In a preferred embodiment, the input/output port 506 couples to a data network, which couples to a wide area network and/or world wide area network, as noted. The network processor also includes one or more input/output ports for one or more local area networks 507. The network processor has an interface to a memory device 504, which can include a dynamic random access memory, static random access memory, or other types, depending upon the specific embodiment. As merely an example, the network processor can be any suitable type such as the ADM5120 Series manufactured by Infineon Technologies AG of Germany, but can also be others. In a specific embodiment, the system also has a power module 521, which provides suitable power (e.g., voltage/current) to each of the elements described herein. Of course, one of ordinary skill in the art would recognize other variations, modifications, and alternatives.

In a preferred embodiment, the system has the power line chip 509, called herein "PLC" chip, which is coupled between the network processor and analog front end 511 device. As shown, the PLC is coupled to the analog front end (AFE) module 511. The AFE module interfaces between the chipset and a three phase coupler 519 according to a specific embodiment. Between the AFE and coupler is transmit 513 and receive 517 devices according to a specific embodiment. A switching device couples to the AFE chip and transmit device according to a specific embodiment. Further details of the power line chip, AFE, TX/RX devices, and coupler are provided throughout the present specification and more particularly below.

In a specific embodiment, the power line device can be any suitable power line integrated circuit chips and/or chip sets. As merely an example, the power line chip is an integrated circuit chip sold under part number 5500CS manufactured by INTELLON CORPORATION of Florida. Here, the chip can be a single-chip power line networking controller with integrated MII/GPSI, USB. The chip interfaces with Ethernet interfaces, among others. Preferably, there is at least a 80 Mbps data rate on the power line, although others may desirable. Additional features include an Integrated 10-bit ADC, 10-bit DAC and AGC, a selectable MDI/SPI PHY management interface, general purpose 8-wire serial PHY data interface. Preferably, the signal processing uses Orthogonal Frequency Division Multiplexing (OFDM) for high data reliability, as well as adaptive channel characterization, Viterbi and block coding. In alternative embodiments, the power line device can also include other chip designs that are suitable for the present methods and systems. Of course, one of ordinary skill in the art would recognize other variations, modifications, and alternatives.

In a specific embodiment, the three phase coupler can be any suitable device capable of injecting power line signals directly into each of the three phases 521, 523, 525 independently. In a specific embodiment, the coupler can be an inductive coupler and/or capacitive coupler, but may be others. In a preferred embodiment, each of the three phases receives/transmits power line signals directly (and are not coupled to each other at the gateway or within a vicinity of the gateway) to more efficient signal transfer and receive processes. As merely an example, the coupler can be either inductive and/or capacitive, but can be others. As noted, the three phase coupler is merely an example and should not unduly limit the scope of the claims herein.

Figure 6:
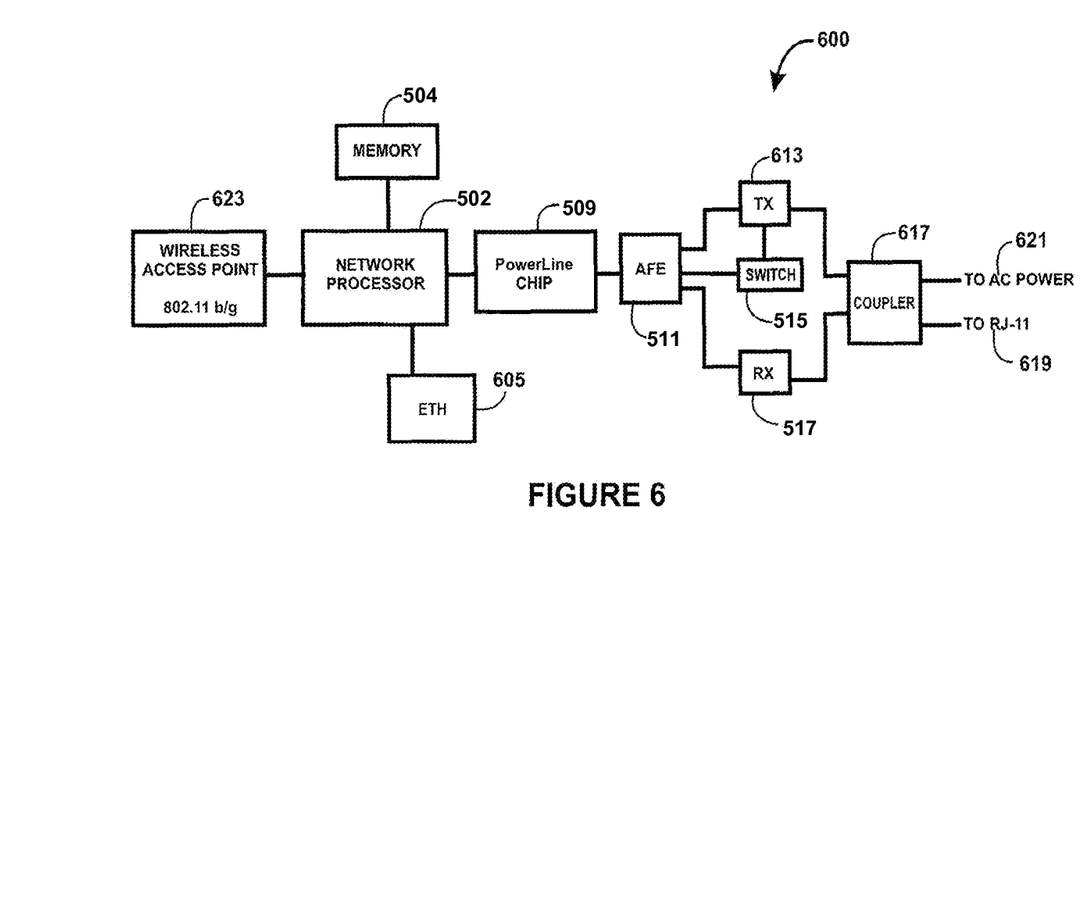
FIG. 6 is a simplified block diagram of a power line device for the gateway device according to an embodiment of the present invention.

FIG. 6 is a simplified block diagram of a power line device 600 for the gateway system according to an embodiment of the present invention. In a preferred embodiment, the module is provided within a interior region of the housing. As shown, the module has a network processor 502 within the housing and coupled to the power line signal via power line chip 509. In a specific embodiment, the network processor includes one or more input/output ports for one or more local area networks via line or lines 621. In a specific embodiment, the local area network can be Ethernet and/or other like technology. The network processor has an interface to a memory device 504, which can include a dynamic random access memory, static random access memory, or other types, depending upon the specific embodiment. As merely an example, the network processor can be any suitable type such as the ADM5120 Series manufactured by Infineon Technologies AG of Germany, but can also be others. Of course, one of ordinary skill in the art would recognize other variations, modifications, and alternatives.

In a preferred embodiment, the system has the power line chip 509, called herein "PLC" chip, which is coupled between the network processor and an analog front end 511 device. As shown, the PLC is coupled to the analog front end (AFE) device and/or module. The AFE module interfaces between the PLC chip and a phase coupler 619 according to a specific embodiment. Between the AFE and coupler is transmit 613 and receive 517 devices according to a specific embodiment. A switching device 515 couples to the AFE chip and transmit device according to a specific embodiment. Further details of the power line chip, AFE, TX/RX devices, and coupler are provided throughout the present specification and more particularly below.

In a specific embodiment, the power line device can be any suitable power line integrated circuit chips and/or chip sets. As merely an example, the power line chip is an integrated circuit chip sold under part number 5500CS manufactured by INTELLON CORPORATION of Florida. Here, the chip can be a single-chip power line networking controller with integrated MII/GPSI, USB. The chip interfaces with Ethernet interfaces 605, among others. Preferably, there is at least a 80 Mbps data rate on the power line, although others may desirable. Additional features include an Integrated 1O-bit ADC, 1O-bit DAC and AGC, a selectable MDI/SPI PHY management interface, general purpose 8-wire serial PHY data interface. Preferably, the signal processing uses Orthogonal Frequency Division Multiplexing (OFDM) for high data reliability, as well as adaptive channel characterization, Viterbi and block coding. In alternative embodiments, the power line device can also include other chip designs that are suitable for the present methods and systems. Of course, one of ordinary skill in the art would recognize other variations, modifications, and alternatives.

In a specific embodiment, the coupler 617 can be any suitable device capable of injecting and/or receiving power line signals to and/from a power line, which is coupled to a power line network. In a specific embodiment, the coupler can be an inductive coupler and/or capacitive coupler, but may be others. As merely an example, the coupler (either inductive and/or capacitive coupler), but can be others. The coupler couples to AC power line 621, which is provided on the power line network. Additionally, the coupler or other coupling device is coupled to an RF-11 outlet 619 for telephone communication. Of course, there can be many variations, modifications, and alternatives.

In a specific embodiment, the network processor is also coupled to wireless access point device 523. The wireless access point device can be any suitable integrated circuit chip and/or chips, including modules, according to a specific embodiment. The wireless access point device can be an 802.11-type device or other type of wireless transmission/receive device according to a specific embodiment. The wireless access device is coupled to the wireless antenna according to a specific embodiment. Of course, there can be other variations, modifications, and alternatives.

Figure 7:
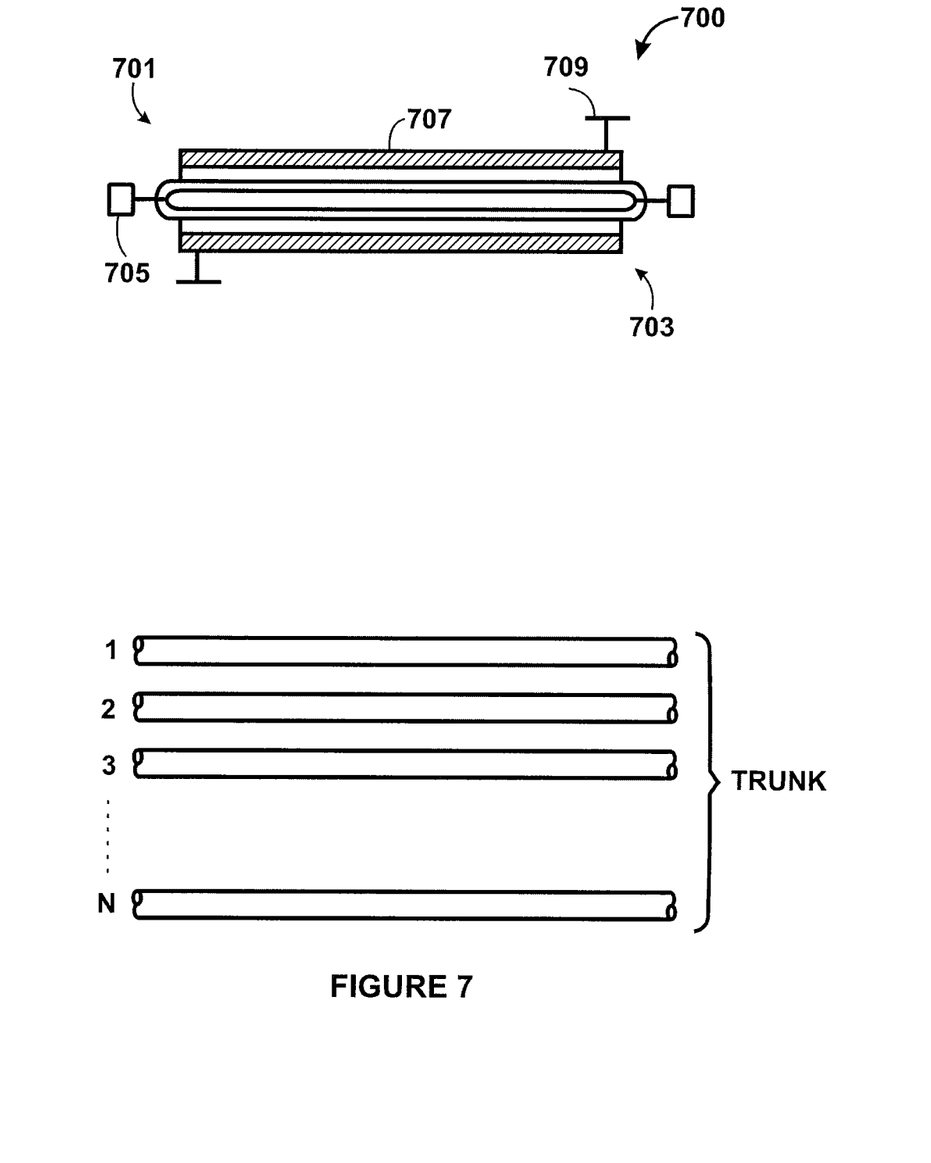
FIG. 7 is a simplified diagram of shielded cable according to an embodiment of the present invention.

FIG. 7 is a simplified diagram of shielded cable 700 according to an embodiment of the present invention. This diagram is merely an example, which should not unduly limit the scope of the claims herein. One of ordinary skill in the art would recognize many variations, alternatives, and modifications. As shown, a shielded cable comprises a first end 701 and a second end 703. In a specific embodiment, the first end is coupled to a coupling device 705. The one or more shielded cables comprises as conventional cable having a first insulating material provided on the conventional cable, a shielding provided overlying the first insulating material, and a second insulating material overlying the shielding. The one or more shielded cables is adapted to transfer the power line signal free from any substantial interference with the high frequency noise being able to cause interference with the power line signal. As also shown, the shield 707 is often grounded or coupled to a relative potential 709. Further details of the shielded cables are provided throughout the present specification and more particularly below.

Figure 8:
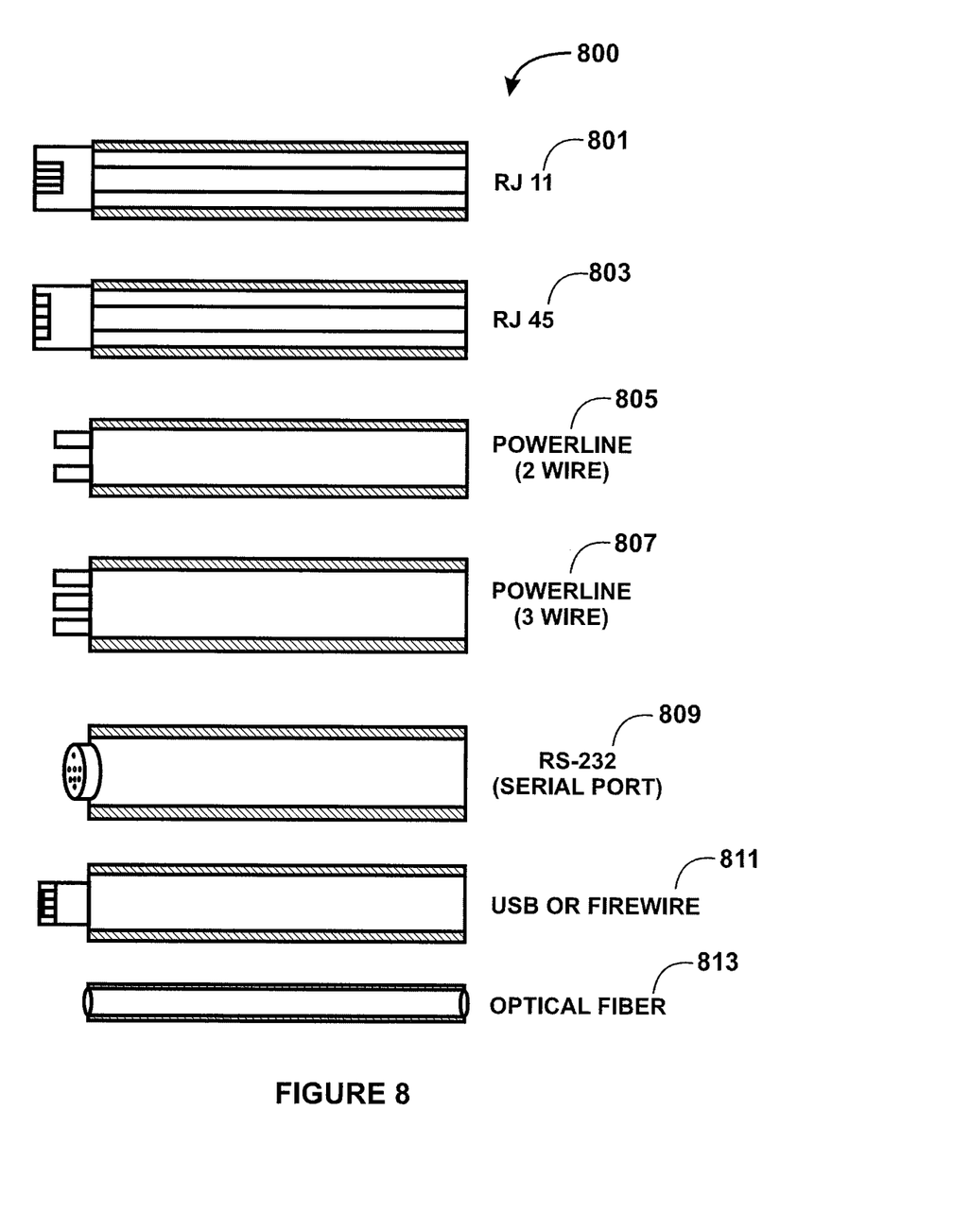
FIG. 8 is a simplified diagram of shielded cable according to alternative embodiments of the present invention.

FIG. 8 is a simplified diagram of shielded cables 800 according to alternative embodiments of the present invention. This diagram is merely an example, which should not unduly limit the scope of the claims herein. One of ordinary skill in the art would recognize many variations, alternatives, and modifications. As shown, the shielded cable can be configured in one of a plurality of different embodiments. That is, the shielded cable can include an RJ 11-type connection 801, RF 45-type connection 803, two wire power line 805, three wire power line 807, RS-232 type connection 809, Universal Serial Bus (USB) or Firewire™ type connection 811 by Apple Computer Inc. of Cupertino Calif. In other embodiments, the shielded cable can include an optical fiber 813 therein. Of course, there can be other variations, modifications, and alternatives.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A real-time management networking system for a manufacturing environment, the system comprising:
    a spatial region, the spatial region being adapted for one or more manufacturing equipment devices, the one or more manufacturing equipment devices being associated with a manufacture of a product, the manufacturing equipment being able to generate a high frequency noise, the high frequency noise being able to cause interference with a data signal;
    a power line gateway device being provided within a desired region of the spatial region, the power line gateway device positioned between the external data source and a plurality of power line client devices, the power line gateway device comprising a power line device coupled to an interface device and a coupling device configured to couple the power line gateway device to a plurality of power line client devices, the interface device being coupled to a data connection, the power line device being capable of converting a data signal from the data connection into a power line signal;
    one or more shielded cables coupled to the coupling device, the one or more shielded cables comprising a first end and a second end, the first end being coupled to the coupling device, the one more shielded cables comprising a conventional cable having a first insulating material provided on the conventional cable, a shielding provided overlying the first insulating material, and a second insulating material overlying the shielding, the one or more shielded cables being adapted to transfer the power line signal free from any substantial interference with the high frequency noise being able to cause interference with the power line signal; and
    an outlet device comprising customer-premises equipment (CPE) device, the CPE device being capable of controlling the plurality of power line client devices, the outlet device coupled to at least the second end of the one or more shielded cables, the outlet device being adapted to convert, at the CPE device, the power line signal received from the powerline gateway device via the one or more shielded cables into at least an Ethernet signal or a RS232 signal, the Ethernet signal or RS232 signal being substantially free from interference from the high frequency noise.

2. The system of claim 1 wherein the product can be selected from an electronic device, an automobile, a petroleum product, or a chemical product.

3. The system of claim 1 wherein the conventional cable is selected from at least a phone line or a power line.

4. The system of claim 1 wherein the shielding comprises a plurality of meshed wiring provided surrounding an entirety of the first insulating material.

5. The system of claim 1 wherein the shielding comprises a nickel or copper material.

6. The system of claim 1 wherein the one or more cables is a length between the first end and the second end, the length being up to three hundred meters.

7. The system of claim 1 further comprising one or more repeater device coupled between the first end and the second end, the one or more repeater devices being adapted to increase a level of the power line signal.

8. The system of claim 1 wherein the shielding is maintained at an electrical ground potential.

9. The system of claim 1 wherein the one or more shielded cables includes a length provided at a predetermined distance above the one or more manufacturing equipment.

10. The system of claim 1 wherein the power line signal is an OFDM signal.

11. The system of claim 1 wherein the power line signal has a data rate of about 200 Mbps or greater.

12. The system of claim 1 wherein the power line signal has a data rate of about 14 Mbps or 85 Mbps or 100 Mbps.

13. The system of claim 1 wherein the desired region is a center region.

14. The system of claim 1 wherein the system is configured to control an inventory of the product being manufactured.

15. The system of claim 1 wherein the system is provided for control of the one or more manufacturing equipment.

16. The system of claim 1 wherein the one or more shielded cables comprises at least five shielded cables in a trucking configuration, each of the five shielded cables being substantially free from any noise caused by any of the other shielded cables.

17. The system of claim 1 wherein the one or more shielded is spatially disposed respectively in one or more regions of the spatial region.

18. The system of claim 1 wherein the power line signal can include information from process equipment, inventory, or others.

19. The system of claim 1 wherein the outlet device comprise a customer-premises equipment (CPE) device, the CPE device being capable of controlling one or more local devices.

20. The system of claim 1 further comprising a plurality of rf devices.

21. A real-time management networking system for a manufacturing environment, the system comprising:

a spatial region, the spatial region being adapted for one or more manufacturing equipment devices, the one or more manufacturing equipment devices being associated with a manufacture of a product, the manufacturing equipment being able to generate a high frequency noise, the high frequency noise being able to cause interference with a data signal;

a power line gateway device being provided within a desired region of the spatial region, the power line gateway device positioned between the external data source and a plurality of power line client devices, the power line gateway device comprising a power line device coupled to an interface device and a coupling device configured to couple the power line gateway device to a plurality of power line client devices, the interface device being coupled to a data connection, the power line device being capable of converting a data signal from the data connection into a power line signal, the power line signal including an OFDM signal;

one or more shielded cables coupled to the coupling device, the one or more shielded cables comprising a first end and a second end, the first end being coupled to the coupling device, the one more shielded cables comprising a conventional cable having a first insulating material provided on the conventional cable, a shielding provided overlying the first insulating material, and a second insulating material overlying the shielding, the one or more shielded cables being adapted to transfer the power line signal free from any substantial interference with the high frequency noise being able to cause interference with the power line signal; and an outlet device comprising customer-premises equipment (CPE) device, the CPE device being capable of controlling the plurality of power line client devices, the outlet device coupled to at least the second end of the one or more shielded cables, the outlet device being adapted to convert, at the CPE device, the power line signal received from the powerline gateway device via the one or more shielded cables to a network signal, the outlet device includes a high frequency filter.

* * * * *